(12) United States Patent
Mabrouk et al.

(10) Patent No.: US 10,401,479 B2
(45) Date of Patent: Sep. 3, 2019

(54) REMOTE SENSING OF HUMAN BREATHING AT A DISTANCE

(71) Applicants: Mohamed Mabrouk, Cairo (EG); Izmail Batkin, Gloucester (CA); Sreeraman Rajan, Kanata (CA); Miodrag Bolic, Ottawa (CA); Voicu Groza, Ottawa (CA); Hilmi Dajani, Ottawa (CA)

(72) Inventors: Mohamed Mabrouk, Cairo (EG); Izmail Batkin, Gloucester (CA); Sreeraman Rajan, Kanata (CA); Miodrag Bolic, Ottawa (CA); Voicu Groza, Ottawa (CA); Hilmi Dajani, Ottawa (CA)

(73) Assignee: University of Ottawa, Ottawa (CA)

( * ) Notice: Subject to any disclaimer, the term of this patent is extended or adjusted under 35 U.S.C. 154(b) by 376 days.

(21) Appl. No.: 14/713,936

(22) Filed: May 15, 2015

(65) Prior Publication Data
US 2015/0369911 A1    Dec. 24, 2015

Related U.S. Application Data

(60) Provisional application No. 61/994,408, filed on May 16, 2014.

(51) Int. Cl.
*G01S 7/41* (2006.01)
*G01S 13/52* (2006.01)
*G01S 13/88* (2006.01)

(52) U.S. Cl.
CPC .............. *G01S 7/415* (2013.01); *G01S 13/52* (2013.01); *G01S 13/888* (2013.01)

(58) Field of Classification Search
CPC ......... G01S 7/415; G01S 13/52; G01S 13/888
(Continued)

(56) References Cited

U.S. PATENT DOCUMENTS 7,148,836 B2    12/2006    Romero et al.
7,567,200 B1    7/2009    Osterweil
(Continued)

FOREIGN PATENT DOCUMENTS

| CN | 103616729 | 3/2014 |
| WO | 2008001092 | 1/2008 |
| WO | 2012148280 | 11/2012 |

OTHER PUBLICATIONS

L. Liu, M. Popescu, M. Skubic, M. Rantz, T. Yardibi, P. Cuddihy, "Automatic fall detection based on doppler radar motion signature," 5th PervasiveHealth Workshop, 2011.
(Continued)

*Primary Examiner* — Frank J McGue
(74) *Attorney, Agent, or Firm* — Garvey, Smith & Nehrbass, Patent Attorneys, L.L.C.; Seth M. Nehrbass; Fabian M. Nehrbass (57) ABSTRACT

A method and system is described for using radar to provide non-contact detection of human breathing at a distance. Radar data is processed to remove clutter and enable detection of a breathing signal. The breathing signal can be used to determine breathing rate or posture of the target. Static obstructions can be removed from the radar data to identify target breathing signal. The system and method can be applicable to emergency response, home or institutional monitoring applications and for detection of medical conditions.

22 Claims, 10 Drawing Sheets (58) Field of Classification Search
USPC .......................................................... 342/28
See application file for complete search history.

(56) References Cited

U.S. PATENT DOCUMENTS

| | | | |
|---|---|---|---|
| 7,679,545 B2 | 3/2010 | Rausch et al. | |
| 7,753,849 B2 | 7/2010 | Morgan et al. | |
| 7,898,455 B2 | 3/2011 | Rosenbury | |
| 8,026,840 B2 | 9/2011 | Dwelly et al. | |
| 8,428,696 B2 | 4/2013 | Foo | |
| 8,740,793 B2 | 6/2014 | Cuddihy et al. | |
| 8,742,935 B2 | 6/2014 | Cuddihy et al. | |
| 8,750,971 B2 | 6/2014 | Tran | |
| 8,884,813 B2 | 11/2014 | Bangera et al. | |
| 2004/0155812 A1* | 8/2004 | Pleva | B60K 31/0008 342/74 |
| 2006/0028369 A1* | 2/2006 | Rausch | G01S 7/415 342/22 |
| 2006/0061504 A1* | 3/2006 | Leach, Jr. | G01S 7/41 342/22 |
| 2008/0074307 A1* | 3/2008 | Boric-Lubecke | A61B 5/0205 342/28 |
| 2011/0285579 A1* | 11/2011 | Bangera | G06Q 30/02 342/189 |
| 2012/0245479 A1 | 9/2012 | Ganesh et al. | |
| 2014/0235965 A1 | 8/2014 | Tran | |
| 2015/0065857 A1 | 3/2015 | Biber et al. | |

OTHER PUBLICATIONS

Changzhan Gu and Changzhi Li; "Assessment of Human Respiration Patterns via Noncontact Sensing Using Doppler Multi-Radar System", Journal of sensors, 2015.

Susek, W.; Stec, B.; "Through-the-Wall Detection of Human Activities Using a Noise Radar With Microwave Quadrature Correlator," IEEE Transactions on Aerospace and Electronic Systems, 2015.

Qiuchi Jian; Jian Yang; Yinan Yu; Bjorkholm, P.; McKelvey, T.; "Detection of breathing and heartbeat by using a simple UWB radar system," 2014 8th European Antennas and Propagation (EuCAP), 2014.

Lanbo Liu; Sixin Liu, "Remote Detection of Human Vital Sign With Stepped-Frequency Continuous Wave Radar," IEEE Journal of Selected Topics in Applied Earth Observations and Remote Sensing, 2014.

* cited by examiner

REMOTE SENSING OF HUMAN BREATHING AT A DISTANCE

CROSS-REFERENCE TO RELATED APPLICATIONS

This application claims priority to U.S. Provisional Patent Application No. 61/994,408 filed May 16, 2014, the entirety of which is hereby incorporated by reference for all purposes.

TECHNICAL FIELD

This disclosure is generally related to radio frequency detection and ranging (RADAR) and, more specifically, to remote sensing of human breathing signals under line-of-sight (LOS) or non-line-of-sight (NLOS) environments.

BACKGROUND

Physiological sensing based on Doppler radar is gaining popularity as a non-contact methodology for monitoring vital signs. In many applications, it is necessary to monitor subject's respiration and heart rate. Especially for emergency rescue operations, where it may be impossible to measure vital signs of burn patients through contact or for subjects trapped in debris, where it may be impossible to reach them, it may be necessary to use a non-contact monitoring approach to acquire these vital signs. Furthermore, non-contact monitoring of vital signs may be useful in long-term monitoring of elderly in home-care where multiple subjects may be monitored independently using a single device. Non-contact monitoring may be a viable method for reducing the health care costs by enabling non-contact vital sign monitoring. In military or police operations, non-contact monitoring may be used for security purposes by tracking subjects of interest even under the ground or behind walls. However, existing systems provide limited capability in identifying human contacts and provide limited information on the identified contact.

Accordingly, systems and methods that enable non-contact detection of human breathing at a distance remain highly desirable.

BRIEF DESCRIPTION OF THE DRAWINGS

Further features and advantages of the present disclosure will become apparent from the following detailed description, taken in combination with the appended drawings, in which.

It will be noted that throughout the appended drawings, like features are identified by like reference numerals.

DETAILED DESCRIPTION

Embodiments are described below, by way of example only, with reference to FIGS. 1-10.

In accordance with an aspect of the present disclosure there is provided a method for detecting a target using a radar, the method comprising: receiving radar data from the radar; performing clutter suppression on the received radar data; detecting one or more targets in specific range bins in the clutter suppressed range data; extracting a breathing signal for the detected one or more targets; extracting parameters of the extracted breathing signal and a breathing rate for the one or more targets; and verifying that each of the one or more targets are in associated range bins based on the extracted parameters. The method may be implemented by a device comprising a memory and a processor coupled to a radar antenna, wherein instructions stored on the memory are executed by the processor by perform the method. A non-transitory computer readable memory containing instructions for executing the method by a processor is also provided.

In accordance with an aspect of the present disclosure there is provided a method for analysing a breathing signal using a radar, comprising cleaning received radar data; performing clutter suppression on received radar data; extracting a frequency of a fundamental harmonic from received radar data extracting amplitudes of the fundamental harmonic and one or more higher harmonics from the received radar data; and determining relationship between the amplitudes of the harmonics to identify a breathing signal. The method may be implemented by a device comprising a memory and a processor coupled to a radar antenna, wherein instructions stored on the memory are executed by the processor by perform the method. A non-transitory computer readable memory containing instructions for executing the method by a processor is also provided.

In accordance with an aspect of the present disclosure there is provided a method of extracting a breathing signal, the method comprising: receiving a radar data; performing clutter suppression on the received radar data; perform time-domain processing on the received radar data; and extract a breathing signal to detect individual pulses of the breathing signal. The method may be implemented by a device comprising a memory and a processor coupled to a radar antenna, wherein instructions stored on the memory are executed by the processor by perform the method. A non-transitory computer readable memory containing instructions for executing the method by a processor is also provided.

The present disclosure relates to non-contact vital signs monitoring and particularly, to remote sensing of human breathing signals. The breathing signal is determined from characteristics of a returned signal from transmitted radar pulses which are modulated by the chest and the abdomen movements due to breathing. The characteristics can be determined from amplitudes, pulse width and peak positions. The system and method is based on portable radar with one or more receiving antennas that is used in human breathing detection under LOS and NLOS conditions. Even though the disclosure describes ultra-wide band (UWB) radars it is not limited to UWB radars only. It may utilize technologies such as Continuous wave radar, Frequency Modulated Continuous Wave radar, pseudo-random noise coded Continuous-wave radar, pseudo-noise Ultra wide band radar (PN-UWB) and some of their variations.

Existing detection system can determine the breathing on the basis of the spectrum analysis of the breathing signal. Extraction of non-stationary physiological signal in noisy environment is a problem. There is a requirement to analyze individual events (human breaths) from point of view physiological constraints in order to remove artifacts and to use these events as triggers in physiological measurements. In general, the existing technology does not take into account the physiological properties of individual event.

According to the first aspect, a method is introduced to extract the breathing signal and estimate the human breathing rate. Stop breathing event can be detected in a short time window.

According to the second aspect, the ratios on the amplitudes of harmonics in the breathing frequency spectrums are utilized in a novel way to detect the posture of the human body. The ratios can be used to detect sleep apnea and fallen people on the ground.

According to the third aspect, noise and clutter suppression techniques combined with distribution analysis are used to enhance detection and reduce false alarms. A method combines two signal processing techniques (SVD and skewness) is used to estimate the target's range-bin and to discriminate between multiple targets using UWB radars. In pseudo-random noise CW radars, the variance and the skewness of the received data at every range zone can be used to estimate the target's range zone and to discriminate between multiple targets. The skewness is a measure of the asymmetry of the probability distribution of the magnitude squared of the received signal.

The scope in this disclosure relates to an apparatus capable to accurately estimating the target range-bin, discriminate between multiple targets, estimate the human breathing rate, detect the stop breathing event, discriminate between human and animals, and estimate the posture of the target.

The following description and the drawings illustrate specific embodiments of the invention sufficiently to enable those skilled in the art to practice them. Other embodiments may incorporate algorithmic and processing changes. Portions and features of some embodiments may be included in or substituted for those of others.

The present disclosure is described based on a PN-UWB radar. The center frequency of the radar was 4.3 GHz and the bandwidth of the radar was 2 GHz. This radar had a separated but co-located transmitter and receiver antennas. However, different types of radars can be applied including different types of UWB radars, radars operating at different frequencies and non-UWB radars especially CW radars. Also, different antenna configurations could be used as well.

Figure 1:
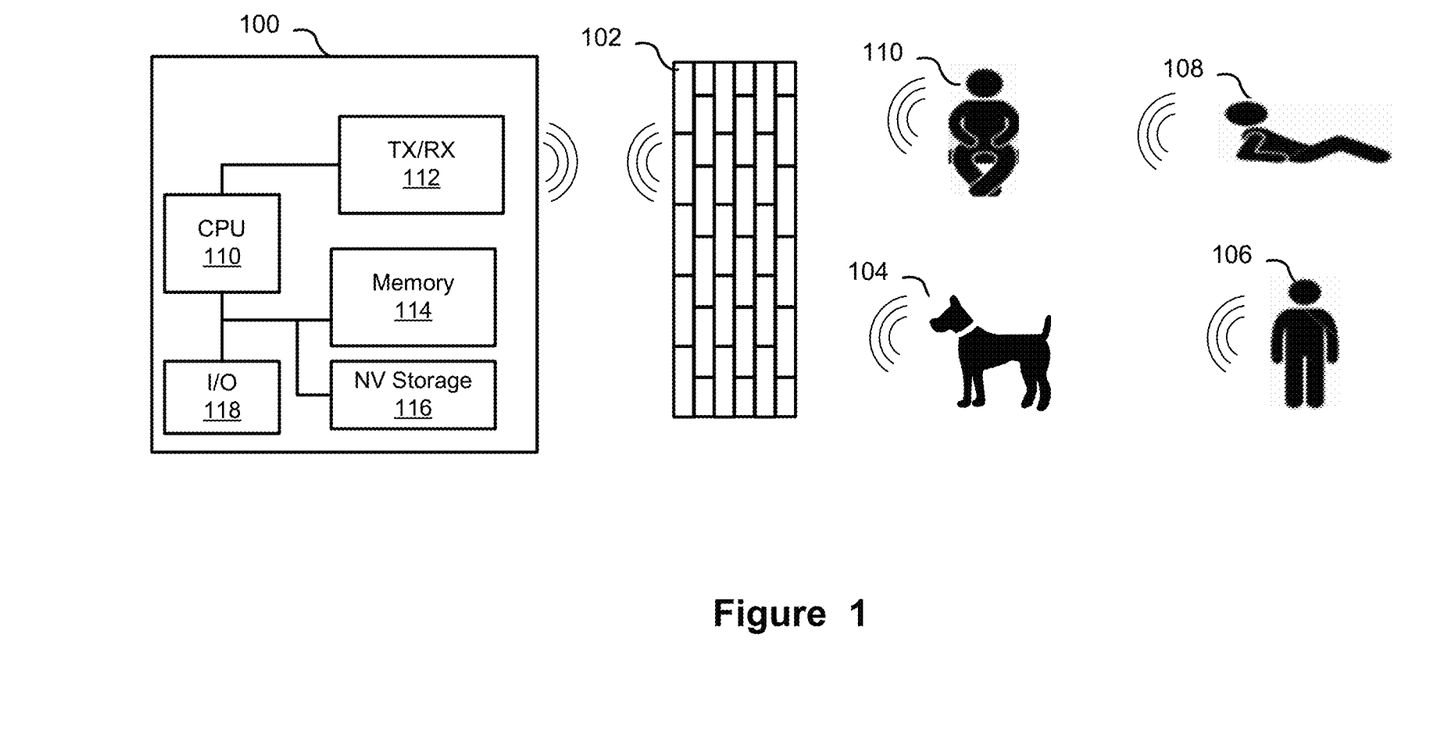
FIG. 1 is a perspective diagram of an example of a surveillance operation in order to detect multiple targets behind the wall.

FIG. 1 illustrates a surveillance operation using a radar 100. The radar 100 comprises a processor 110, coupled to a radar transmitter/receiver 112. The radar can utilize different technologies such as UWB or CW. The processor 110 receives data from the TX/RX radar 112 and processes the signal to identify targets. Processing can be done on the CPU of the radar or collected data by the radar can be transmitted to a computer and processed there. A memory 114 coupled to the processor contains instructions for execution by the processor 110 for executing the method of remote sensing of human breathing signals under line-of-sight (LOS) or non-line-of-sight (NLOS) environments. Non-volatile memory 116 may also be provided for storing instructions or collected data. An input/output 118 interface may be coupled to input devices such as keyboard, mouse, and display interfaces like a monitor, or networking components for sending and/or receiving data through a network. Targets may be obstructed a wall 102, which may be brick, gypsum, or concrete wall. One of the targets is an animal 104 and three humans 106, 108, 110 in different postures are shown. A human 106 is standing, a human 108 is lying down on his/her back, and a human 110 is sitting behind sources of clutter such as the wall 102, desks, other non-moving mass or obstructions. The methods described may also be applied to detection systems when the radar is line of sight or non-line of sight to the targets. The radar antenna may be behind an object, within the room or near the target.

The first aspect of the present disclosure is related to detection of breathing rates of targets. Based on the breathings rate, it is possible to distinguish if the target is a human or not. Non-human target may be a pet. The second aspect of the present disclosure is related to detecting the posture of humans. The third aspect of the present disclosure is related to removing the clutter, and to discriminate between targets.

Figure 2:
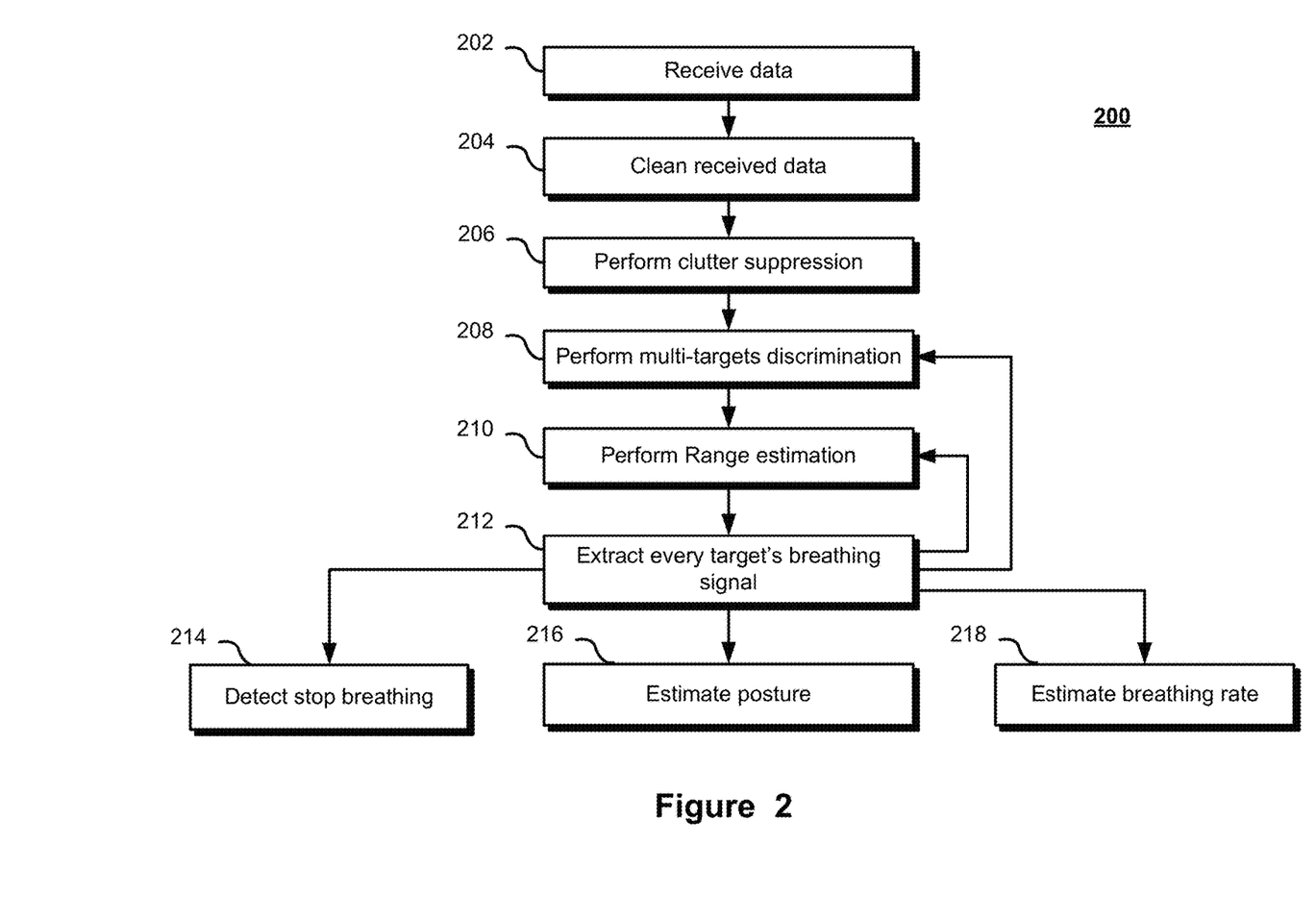
FIG. 2 is a flow chart of a method of operation applied to the data received by the radar receiver to estimate the target range-bin, discriminate between multiple targets, detect the stop breathing event, discriminate between human and animals, and estimate the posture of the target.

FIG. 2 illustrates a main operation method 200 which can be executed by a processor of the radar 100 or by a processing device connected thereto. Detection of the breathing signal can be performed by processing in time-domain to detect individual pulses of the breathing signal. Data is received (202) and unwanted frequencies are removed to de-noising the received data by attenuating noise and clutter effects in the breathing signal. A Band-Pass-Filter (BPF) is used to filter frequencies out of the transmitter frequency band which may distort the received range profile signal (204). A simple Moving Target Indicator (MTI) filter is applied to the data in each range bin according to the sampling time of the received waveforms to eliminate the effect of clutter and detect the chest wall movements of the target. The filter has a zero at frequency equal to zero. This simple filter acts as a high-pass filter and can eliminate stationary clutter. An additional Band-Pass-Filter (BPF) from 0.1-1 Hz can be applied to each range bin to eliminate the frequencies out of the range of the human breathing frequency is applied. Clutter suppression is then performed (206) using Singular Value Decomposition (SVD) on the output of the data cleaning algorithm.

The output of the radar system provides range profiles obtained as a data matrix X after a correlation process. The range-profile is recorded in N range-bins which is the number of the columns of the matrix X. The radar scans are recorded in M scans, for example every 0.2 seconds, which represents the rows of the matrix X. Each scan has a data vector of length N. The resulting output is a matrix, $$X \in \mathbb{C}^{M \times N} \tag{1}$$

If M≥N, then the SVD of X can be presented as $$X = USV^T \tag{2}$$

where,

-continued $$S = \begin{pmatrix} \sum \\ 0 \end{pmatrix}, S \in \mathbb{C}^{M \times N}, U \in \mathbb{C}^{M \times M}, V \in \mathbb{C}^{N \times N}, U^T U = I,$$

$$V^T V = I.$$

The data matrix may be thought of summation of N individual Eigen matrices, each given by equation (3).

$$D_j = U S_j V^T \quad (3)$$

where $D \in \mathbb{C}^{M \times N}$, $j \in \{1, \ldots, N\}$, $S_j$ is a matrix of the same size as S which all elements are zero except S(j,j). The data matrix X can be rewritten as $$X = X_{clutter} + X_{targets} + X_{noise} \quad (4)$$

However, to detect the targets the components of $X_{clutter}$ and $X_{noise}$ need to be removed from (4). SVD operation is treated like a filtering operation for this purpose and is applied iteratively to remove the contributions of clutter with the motivation to enhance the correlation values related to the target. SVD can be used in decomposing the received data to multiple components. If the component that has the clutter information is known, it can be removed by exchanging this component by zero. Since the multiple wall reflections can occur and antenna coupling are assumed to have the dominant energy, these appear through the most dominant singular value of X and belong to the $X_{clutter}$. Hence this needs to be removed from X. The data matrix is reconstructed after removing the first singular value. An inverse decomposition process can be used to reconstruct the data without the clutter information. Since energy contribution of clutter may go beyond the first singular value, SVD operation is repeated and the data matrix is reconstructed after removing the next singular value. Ideally this process is repeated till most of the clutter is removed. The final reconstructed data matrix has range returns majorly due the targets. As the singular values related to clutter are removed, the energy related to target contributions dominate and this information is used to identify the range bin where the target may be present.

SVD technique combined with the skewness method can accurately estimate the target's range bin and discriminate between multiple targets based on removing singular values and studying the skewness of the probability distribution of the absolute value for the amplitude squared of radar returns. After cleaning the data and performing clutter suppression, multi-targets discrimination (208) is performed and range estimation (210) on the data. In order to detect the presence of the target in any range bin, skewness is used as the decision statistics. Since the energy distribution of the clutter is different from that of the target, its skewness changes. The human target's range-bin is estimated (210) and the breathing signal is extracted (212). The physiological parameters estimated from the breathing signal and the breathing rate are used to confirm that the targets are really detected in their corresponding range bins (208) (210). As part of the range estimation the determination of the closest target range bin is performed by monitoring changes in the moments of the probability distribution of the received radar data wherein the moments are one of skewness, variance or mean of the probability distribution. The skewness of the probability distribution of the amplitude squared of the received radar data is computed, whereby the first minimum is estimated, whereby the first minimum corresponds to the location of the closest target. The parameters from the breathing signal include one or more of the following parameters: a power of the fundamental harmonic, peak-to-peak interval (PPI), and characteristics of the pulse. The power of the fundamental harmonic is the magnitude squared of the Discrete Fourier Transform for the breathing signal at the frequency of this harmonic, the PPI is the time interval between two sequential breath pulses, and the characteristics of the pulse are the breath pulse time interval and its amplitude. The extracted parameters may also be used for modifying the frequency band of interest of the band-pass filter for extracting the breathing signal by adjusting upper and lower cut-off frequencies of the band-pass filter.

Estimation of the breathing rate is performed (218) and for detection of the stop-breathing event (214). The posture estimation (216) is performed by studying the ratio of the amplitude of the $1^{st}$, $2^{nd}$, and $3^{rd}$ harmonics of the extracted breathing signal.

Figure 3:
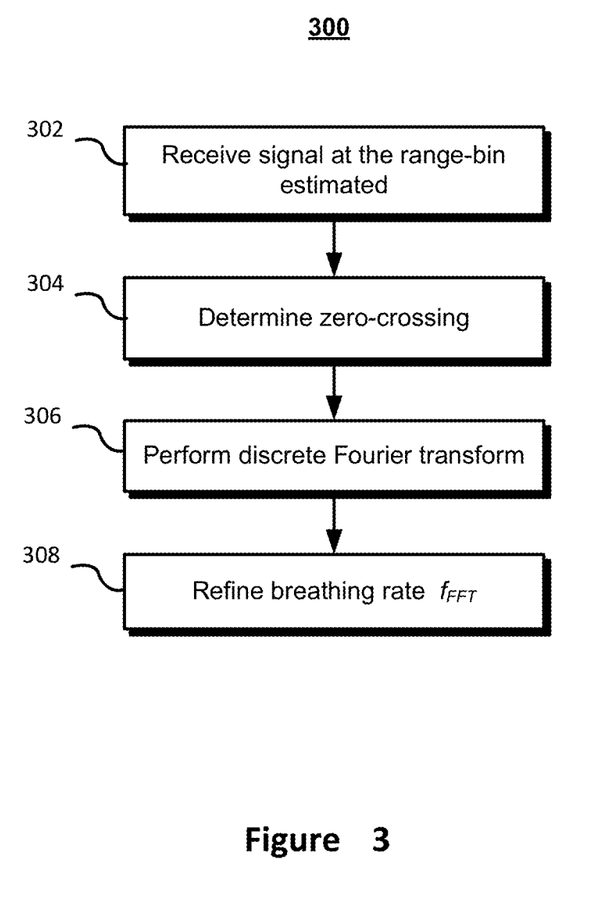
FIG. 3 is a flow chart illustrating a method for human breathing rate estimation.

FIG. 3 illustrates method 300 of the human breathing rate estimation method. In accordance with some embodiments the breathing rate estimation may include blocks for estimating breathing rate (one of the blocks 304, 306 or their combination) and detection of the number of breathing pulses (304), defined by one successive inhale and exhale movements. In addition, every block in FIG. 3 could be replaced with other blocks that perform similar functions.

An example of the implementation of the human breathing rate estimation is presented. The human respiration rate is from 0.1 to 0.8 Hz and the Peak-to-Peak Interval (PPI) between any two consecutive breaths is from 1.25 to 10 seconds. The method will be applied to the extracted signal (212) in the range-bin estimated and after applying range estimation (210). The breathing signals of the targets are collected (302). A zero-crossing algorithm is applied (304) to obtain a coarse estimation of the breathing frequency (a breathing rate numerical value). FFT estimator, (306) refines the breathing rate estimation (308). In this example, adjustable band pass filter is used to refine the breathing rate estimation (306).

The output of the zero crossing algorithm (304) is the Time-of-Arrival (ToA) of the range profile amplitude in a specific range-bin. The mean value of PPI is $$\mu_B = \frac{1}{N_{PPI}} \sum_{n=1}^{N_{PPI}} T_n \quad (5)$$

where $\mu_B$ the mean value of the PPI is detected in a range bin, $N_{PPI}$ is the number of peaks, and $T_n$ is the time interval between the peak number n−1 and the peak number n. The breathing rate detected by zero crossing algorithm is equal to $$\frac{1}{\mu_B}.$$

The method can detect stop-breathing in time domain in a short time window less than 20 sec.

Figure 4:
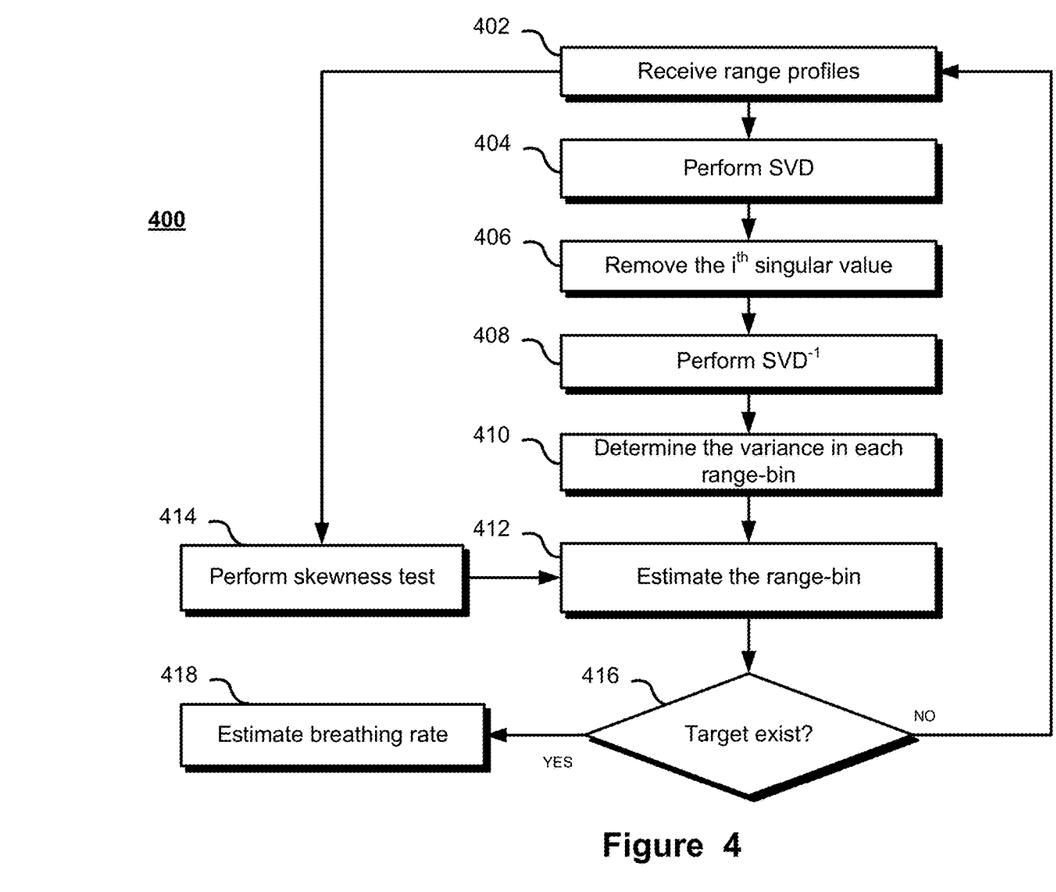
FIG. 4 is a flow chart illustrating a method for target range estimation and discrimination between multiple targets.

FIG. 4 illustrates the method 400 of the clutter suppression, range estimation, and discrimination between multiple targets. Detection of a human target is based on detection of presence of breathing signal. Hence, only the signal content in the breathing frequency band is considered and this content is extracted from the variation in the received signal amplitude. The input signal is a set of received range profiles over time provided by the radar (402). For a given time t, correlation content at every possible range is provided. The signal is dealt with that includes the clutter and the signal content in the breathing frequency band. To remove clutter, SVD-based approach (404), is undertaken in the case of using UWB radars. Principal components are removed iteratively and the signal is reconstructed. The maximum energy range-bin in the reconstructed signal in every iteration is recorded and considered as a possible target (412). Targets can be detected from the reconstructed signal after removing up to five principal components. Once the possible target range-bins are detected, the range needs to be estimated (412). The skewness method (414) is utilized to estimate the target's range. The radar collects the reflected waveform in a scans matrix X after a correlation process. The range-profile is recorded in N range-bins which is the number of the columns of the scans matrix X. The radar scans are recorded in M scans, for example every 0.2 seconds, which represents the rows of the scans matrix X. Each scan has a data vector of length N. As a result of SVD (404), it is expected that the majority of energy of human breathing signal in one singular matrix. If it is known which singular value in the diagonal matrix contains clutter and noise data, the value can be eliminated and reconstruct the data matrix using inverse transformation of the SVD (408). The first principal component contains clutter only. In the case of CW radars, a Pseudo-Random code can be used at the receiver and the transmitter to estimate the target's position. The use the SVD technique in (404) may not be required; however, the skewness test (414) may be applied to the received signal to distinguish between clutter and human targets.

Figure 5:
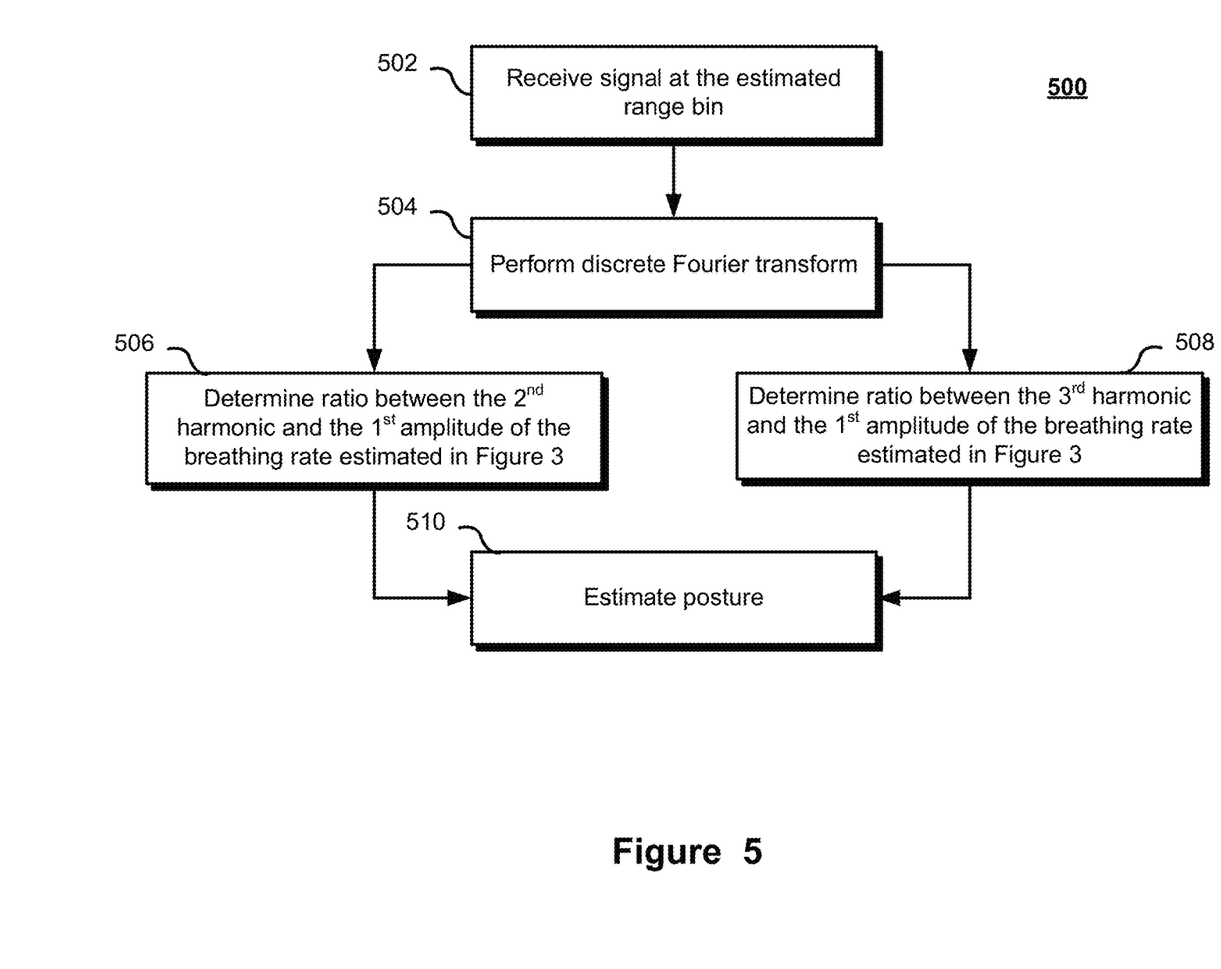
FIG. 5 is a flow chart illustrating a method for human posture estimation.

In PN-UWB radars, the distribution of the amplitude squared of the signal received in a target's range-bin is being analysed. The distribution is exponential in a clutter range-bin while log-normal in a target range-bin (412). The two distributions can be presented as a Weibull distribution with different scale and shape factors. The skewness of the distribution when a target exists in a range-bin (YES at 416) will be less than the skewness of the distribution when a target does not exist in another range-bin (NO at 416). The distribution of a given range over time will have skewness value from zero to C, where C is a constant number, if it is clutter and if the target is present it will drop to less than β where β is a threshold value. A transition from C to any reasonably small value will constitute detection of human target. The detection decision (416) may be taken according to Eq. 6.

$$\text{Skewness} \underset{H_0}{\overset{H_1}{\underset{<}{\gtrless}}} \beta = [\text{mean}(|\gamma|) - \sigma] \quad (6)$$

where, $H_0$ is the null hypothesis that the amplitude of the received signal is the result of interference only, and $H_1$ is the hypothesis that the amplitude of the received signal is combined result of interference, clutter, and echoes from a target, γ is the skewness in all range-bins, and σ is the variance of the skewness in all range-bins. Each pulse is evaluated against predefined thresholds in order to reject certain pulses and estimate the breathing rate based on accepted pulses. In CW radars, the PN code can be used to divide the radar range to range zones. A PN code is used to identify which zone contains target information. The skewness test (414) can be applied to the amplitude squared of the received signal in every range zone and equation (6) can be applied for detection decision. The breathing rate estimate can then be provided (418). The effect of the heartbeat harmonics on the breathing signal can result in inter-modulation products which can appear as a multiplication of two Bessel functions, one of them has a modulation index proportional to the displacements due to the breathing, and the other has a modulation index which is proportional to the heart displacements. The inter-modulation products between breathing and heartbeat harmonics can be identified in order to facilitate detection of heart beat signal FIG. 5 illustrates the method 500 of posture estimation method. The signal received at the range-bin estimated (212) and after applying cleaning algorithm (204) is collected (502). Thoracic and abdominal movements are the two important movements related to breathing. However, most of the research in human breathing detection has considered only thoracic movements in modeling the breathing signal. In the disclosed method, the human body was modeled as two cylinders, one corresponding to the thorax and the other corresponding to the abdomen with different displacements and possible phase offsets. The phase variation due to movements of thorax and abdomen was modeled as a non-sinusoidal signal. The discrete Fourier transform of the breathing signal is found first (504). The spectrum magnitudes are determined and they represent the frequencies of the harmonics of the breathing signal. The ratios determined (506 and 508) will change when the target's posture changes. The ratio between the $2^{nd}$ harmonic and the $1^{st}$ amplitude of the estimated breathing rate (506) are determined and the ratio between the $3^{rd}$ harmonic and the $1^{st}$ amplitude of the estimated breathing rate (508) are determined. The posture is then estimated (510) by analysing the ratios. Other algorithms and mathematical formulas that combine the amplitudes of harmonics can be applied as well.

Figure 6:
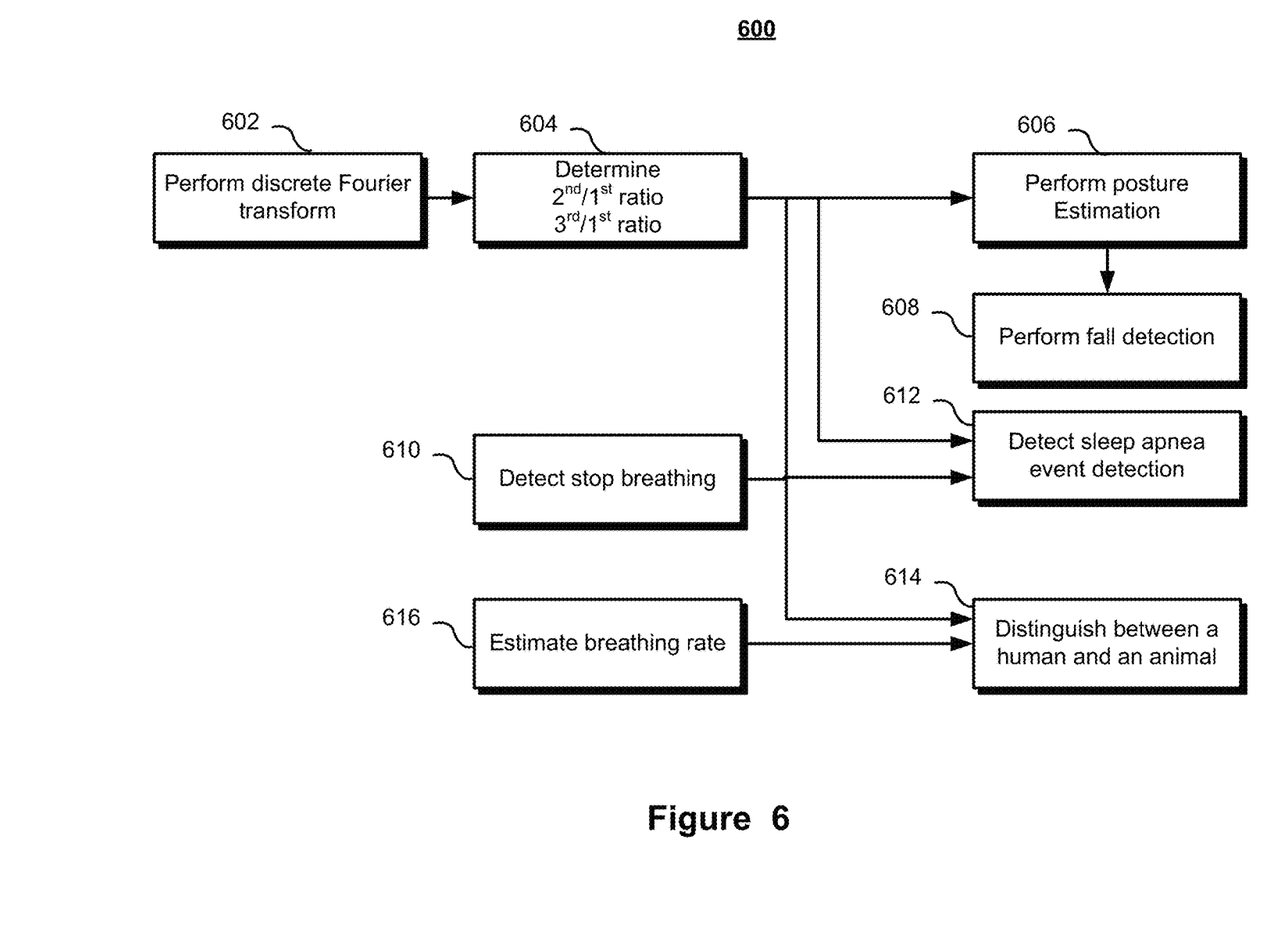
FIG. 6 is a flow chart of a method using the human breathing harmonics ratio in posture estimation, sleeping apnea detection, and fallen people detection.

FIG. 6 illustrates an example of how breathing frequency harmonic ratios can be used in posture estimation, detection of fall event, and sleeping apnea event detection. The harmonic ratios estimated (506 and 508) after applying the DFT (504) and collected (602) will be used to estimate the human posture (606). Posture estimation can be used to detect fallen people on the ground in (608). Stop breathing detection (610) and the ratios (506 and 508) can be used to detect sleeping apnea (612) where sleep apnea is characterized by pauses in breathing or instances of shallow or infrequent breathing during sleep. The breathing rate estimated (616) and the breathing harmonic ratios determined (506 and 508) are used to discriminate between human and animal targets (614) based upon differences ratio and amplitudes.

Figure 7:
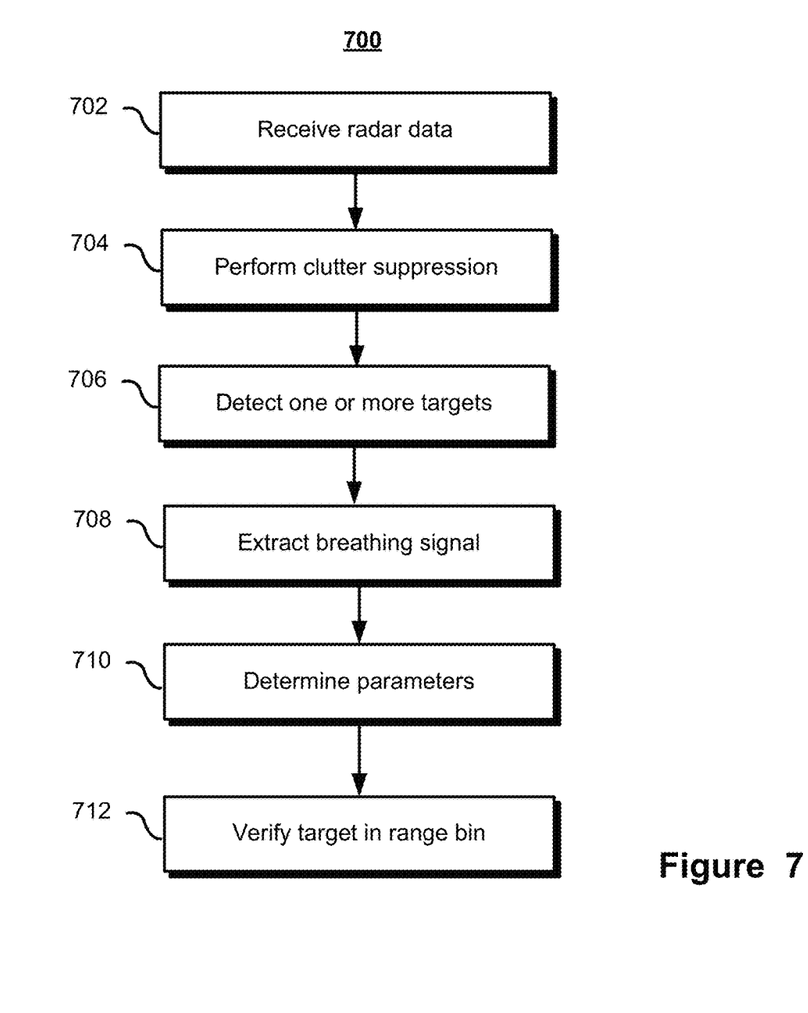
FIG. 7 show a method for detecting a target using a radar antenna.

FIG. 7 shows a method 700 for detecting a target using radar. The method comprises receiving radar data from the radar (702). Clutter suppression is performed on the received radar data (704). One or more targets in specific range bins in the clutter suppressed range data are detected (706). A breathing signal for the detected one or more targets is extracted (708). A breathing rate from the breathing signal for the detected one or more targets are determined (710). Parameters are then extracted the breathing signal and the breathing rate for the one or more targets are estimated. Each of the one or more targets are verified to determine that they are in associated range bins based on the extracted parameters (712).

Figure 8:
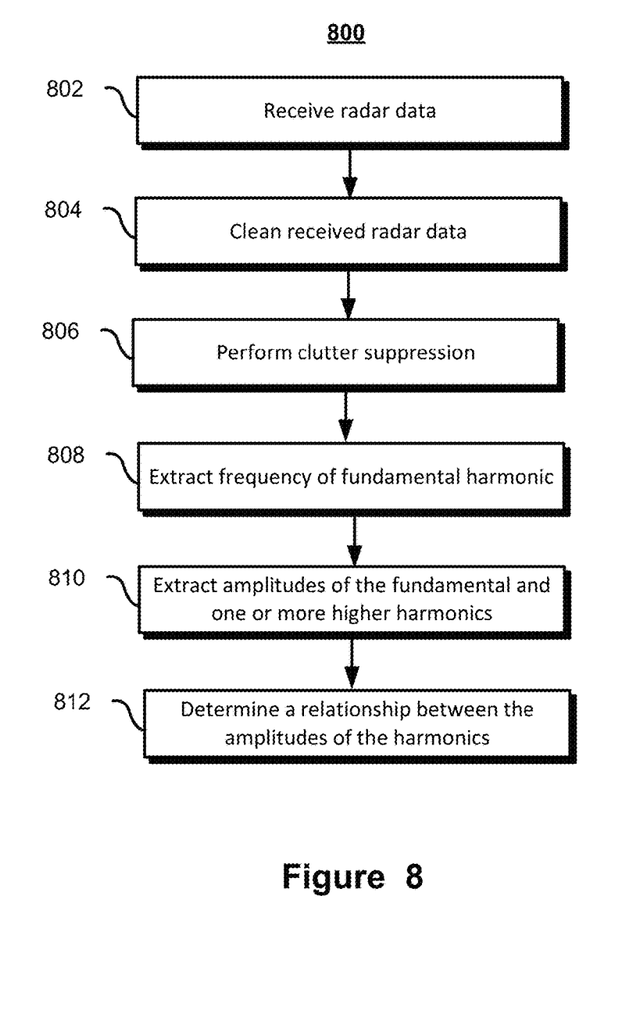
FIG. 8 shows a method for analysing a breathing signal using a radar.

FIG. 8 shows a method 800 for analysing a breathing signal using radar. The method comprising cleaning (804) received radar data (802). Clutter suppression is performed on received radar data (806). Frequency of the fundamental harmonic from received radar data (808) and amplitudes of the fundamental and one or more higher harmonics from the received radar data (810) are extracted. A relationship between the amplitudes of the harmonics is determined to identify a breathing signal (812).

Figure 9:
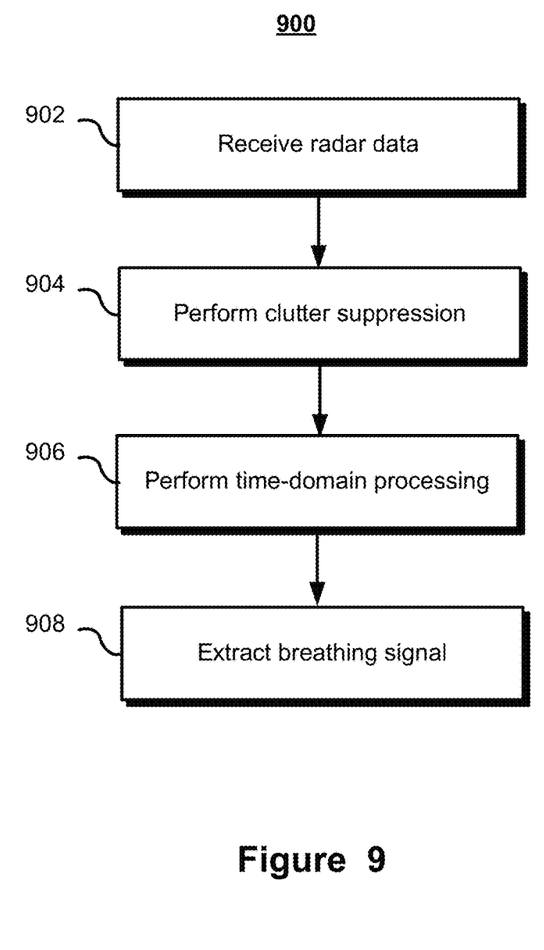
FIG. 9 shows a method of extracting a breathing signal from a radar signal.

FIG. 9 shows a method 900 of extracting a breathing signal. A method of extracting a breathing signal. The method comprising receiving a radar signal (902) and performing clutter suppression on the received radar signal (904). Time-domain processing on the received radar signal (906) is performed in FIG. 3. A breathing signal is extracted from the time-domain process to detect individual pulses of the breathing signal (908).

Figure 10:
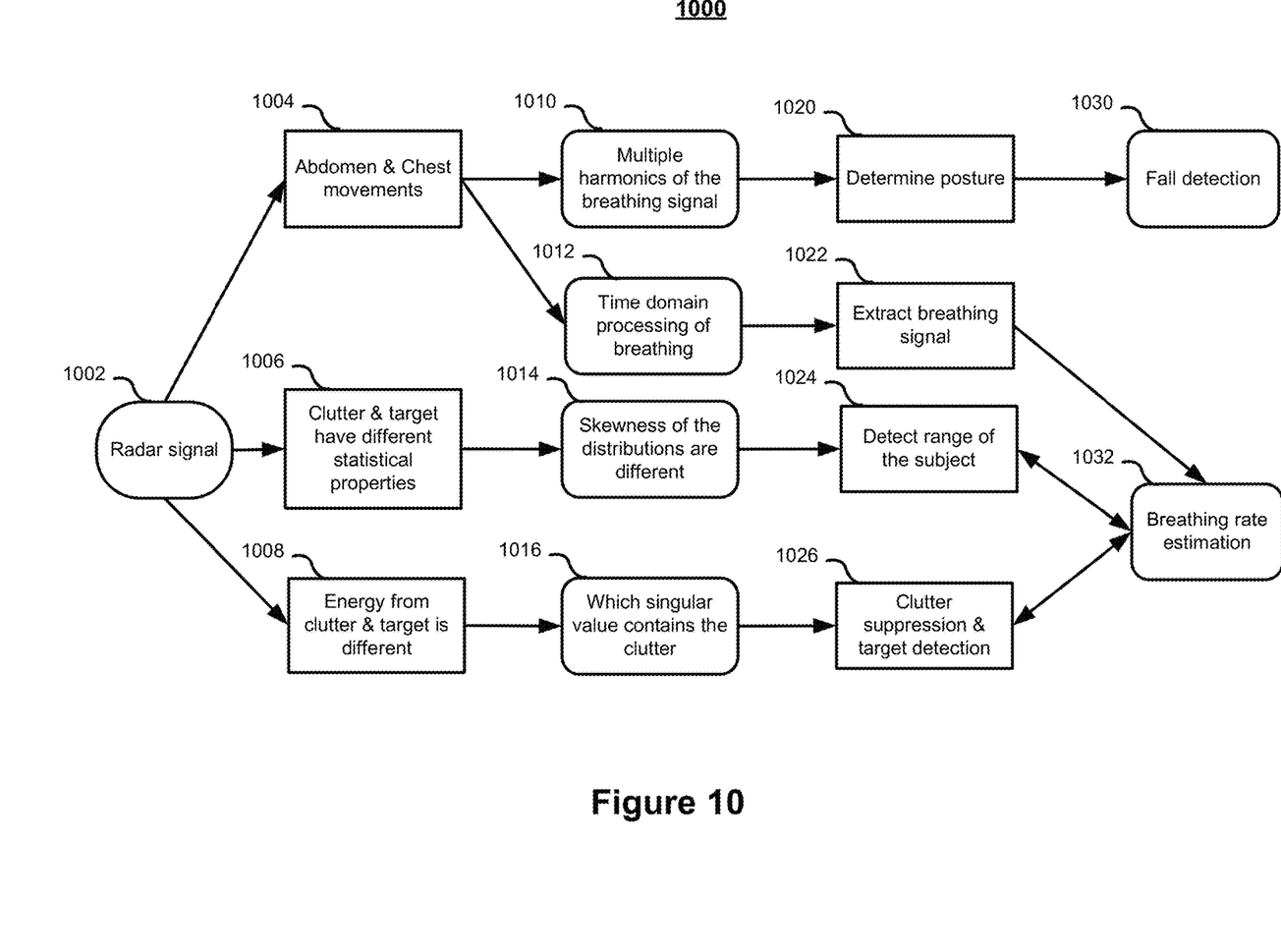
FIG. 10 shows a representation of a system for remote sensing for breathing.

FIG. 10 shows a representation of a system 1000 for remote sensing for breathing. One or more components of the system are executed by a processor from instruction contained in a memory. A signal is received from a radar 1002. The signal is processed to determine if it contains movement data that might originate from abdomen and chest 1004. From the received signal multiple harmonics are present 1010 from which posture of the target can be determined 1020. The determined posture can be used for fall detection 1030. The determined abdomen and chest movement data 1004 can also be time-domain processed 1012 to extract a breathing signal 1022. From the breathing signal breathing rate estimation can be determined 1032. Since the clutter and target have different statistical properties 1006, the skewness of the distributions of signal in the range bins with only clutter are different from the distributions of the signals in the range bins that contain both the target and the clutter 1014. The range of the subject can then be detected 1024 and utilized to discriminate the targets in the breathing rate estimation 1032. Also, because the energy from the clutter and target is different 1008, the singular value that contains the clutter can be determined 1016. Clutter suppression and target detection can be performed 1026 for use in the breathing rate estimation 1032. In some situations, only one of these methods will be enough. However, if the signal-to-noise ratio is low then more reliable breathing rate s obtained by combining methods that rely on detecting the target based on the energy, statistical properties and detected breathing rates.

Each element in the embodiments of the present disclosure may be implemented as hardware, software/program, or any combination thereof. The method may be performed by a processor coupled to a memory coupled, networked, or integrated to a radar antenna or radar processing device. Software codes, either in its entirety or a part thereof, may be stored in a non-transitory computer readable medium or memory (e.g., as a ROM, for example a non-volatile memory such as flash memory, CD ROM, DVD ROM, Blu-ray™, a semiconductor ROM, USB, or a magnetic recording medium, for example a hard disk). The program may be in the form of source code, object code, a code intermediate source and object code such as partially compiled form, or in any other form.

It would be appreciated by one of ordinary skill in the art that the system and components shown in FIGS. 1-10 may include components not shown in the drawings. For simplicity and clarity of the illustration, elements in the figures are not necessarily to scale, are only schematic and are non-limiting of the elements structures. It will be apparent to persons skilled in the art that a number of variations and modifications can be made without departing from the scope of the invention as defined in the claims.

The invention claimed is:

1. A method for detecting a target using a radar transmitter/receiver for detecting a target, the method comprising:
receiving radar data from the radar transmitter/receiver;
performing clutter suppression on the received radar data;
detecting one or more targets in specific range bins in the clutter suppressed radar data;
extracting a breathing signal for the detected one or more targets;
extracting parameters of the extracted breathing signal and estimation of a breathing rate numerical value for the one or more targets;
verifying that each of the one or more targets are in associated range bins based on the extracted parameters;
wherein extracting parameters further comprises detecting a closest target range bin by monitoring changes in moments of a probability distribution of the received radar data wherein the moments are one of a skewness, a variance or a mean of the probability distribution;
wherein a condition for determining if the target is in the range bin is based upon comparing skewness changes relative to a defined threshold based upon characteristics of the breathing signal; and
wherein a condition for determining if the target is in the range bin based on the skewness is defined by:

$$\text{Skewness} \underset{H_0}{\overset{H_1}{\gtreqless}} \beta = [\text{mean}(|\gamma|) - \sigma]$$

where, $H_0$ is a null hypothesis that an amplitude of the breathing signal is a result of interference only, and $H_1$ is a hypothesis that amplitude of the breathing signal is combined result of interference, clutter, and echoes from a target, $\beta$ is the threshold, $\gamma$ is the skewness in all range-bins, and $\sigma$ is the variance of the skewness in all range-bins.

2. The method of claim 1 wherein a distribution of a given range over time will have a skewness value from zero to C, where C is a constant number, if it is clutter and if the target is present it will drop to less than $\beta$ where $\beta$ is a threshold value and a transition from C to any reasonably small value will constitute detection of a human target.

3. The method of claim 1 wherein the method is executed by a computer processor in addition to the radar transmitter/receiver
wherein the radar transmitter/receiver is stationary;
wherein the computer processor receives the radar data from the stationary radar transmitter/receiver coupled to an obstructing surface opposite a target space;
wherein the detection of one or more targets in specific range bins in the clutter suppressed radar data is in the target space;
wherein extracting a breathing signal for the detected one or more targets is in the specific range bins;
wherein verifying that each of the one or more targets are in associated range bins based on the extracted parameters is done by verifying that the breathing signal of each of the one or more targets are in associated range bins in the target space;
wherein the verifying is to confirm that each of the one or more targets are associated with a respective person in the target space; and
wherein identifying the verified one or more targets is done through an input/output interface coupled to the processor.

4. The method of claim 3 wherein extracting the breathing signal is performed by processing in time-domain to detect individual pulses of the breathing signal.

5. The method of claim 3 further comprising applying a band-pass filter for modifying a frequency band of interest for extracting the breathing signal by adjusting an upper and a lower cut-off frequencies of the band-pass filter based on the extracted parameters.

6. The method of claim 3 further comprising detecting stop-breathing events based on an estimated breathing rate numerical value.

7. The method of claim 3 wherein the radar transmitter/receiver is an ultra-wide band (UWB) radar transmitter/receiver, a Continuous wave radar transmitter/receiver, a Frequency Modulated Continuous Wave radar transmitter/receiver, pseudo-random noise coded continuous-wave radar transmitter/receiver, or a pseudo-random noise Ultra wide band (PN-UWB) radar transmitter/receiver.

8. The method of claim 3 wherein performing clutter suppression on the received radar data and detecting the one or more targets from the radar data is performed iteratively by applying singular value decomposition (SVD) to the received radar data.

9. The method of claim 3 wherein the skewness of a probability distribution of amplitude squared of the received radar data is computed and its first significant minimum is estimated, whereby the first minimum corresponds to a location of the closest target.

10. The method of claim 3 wherein detecting the closest target range bin is performed by combining SVD with changes in moments of the probability distribution.

11. The method of claim 10 wherein a zero crossing method is applied to detect individual pulses of the breathing signal.

12. The method of claim 10 wherein the extracted parameters from the breathing signal include one or more of the parameters of: a power of a fundamental harmonic, a peak-to-peak interval, and characteristics of a breathing signal pulse.

13. The method of claim 12 wherein the extracted parameters of each pulse are evaluated against predefined thresholds in order to reject certain pulses and estimate the breathing rate numerical value based on accepted pulses.

14. A method executed using a computer processor and a stationary radar transmitter/receiver for analysing a breathing signal, comprising:
cleaning received stationary radar data, from the stationary radar transmitter/receiver coupled to an obstructing surface opposite a target space;
performing clutter suppression on received stationary radar data;
extracting a frequency of a fundamental harmonic from received stationary radar data in the target space;
extracting amplitudes of the fundamental harmonic and one or more higher harmonics from the received stationary radar data;
determining relationship between the amplitudes of the harmonics to identify a breathing signal of one or more targets, including estimation of a numerical value of breathing frequency;
verifying that the breathing signal of each of the one or more targets are in associated range bins in the target space based on the extracted amplitudes to confirm that each of the one or more targets are associated with a respective person in the target space; and
identifying the verified one or more targets through an input/output interface coupled to the processor.

15. The method of claim 14 wherein determining relationship between the amplitudes of the harmonics is based on ratios between an amplitude of first harmonics and amplitudes of the higher harmonics.

16. The method of claim 14 further comprising detecting posture changes of a single person based on values of the amplitudes of a fundamental frequency and the harmonics.

17. The method of claim 14 further comprising determining posture based on values of the amplitudes of the harmonics.

18. The method of claim 14 further comprising determining if a person is lying on a floor based on the determined relationship.

19. The method of claim 14 further comprising discriminating between several targets breathing at different rates based on existence of several sets of harmonic components of the breathing signal.

20. The method of claim 14 wherein the radar transmitter/receiver is from the group consisting of an ultra-wide band (UWB) radar transmitter/receiver, a Continuous wave radar transmitter/receiver, a Frequency Modulated Continuous Wave radar transmitter/receiver, pseudo-random noise coded continuous-wave radar transmitter/receiver, and a pseudo-random noise Ultra wide band (PN-UWB) radar transmitter/receiver.

21. The method of claim 14 wherein determining harmonics of the breathing signal are utilized to find intermodulation products between breathing and heartbeat harmonics in order to facilitate detection of a heart beat signal.

22. A device comprising:
a processor coupled to a stationary radar antenna of a radar transmitter/receiver; and
a non-transitory memory containing instructions which when executed by the processor and using the radar transmitter/receiver perform steps of:
receiving radar data from the stationary radar antenna coupled to an obstructing surface opposite to a target space;
performing clutter suppression on the received radar data;
detecting one or more targets in specific range bins in the clutter suppressed radar data in the target space;
extracting a breathing signal for the detected one or more targets in the specific range bins;
extracting parameters of the extracted breathing signal and estimation of a breathing rate numerical value for the one or more targets;
verifying that the breathing signal of each of the one or more targets are in associated range bins in the target space based on the extracted parameters to confirm that each of the one or more targets are associated with a respective person in the target space;
wherein extracting parameters further comprises detecting a closest target range bin by monitoring changes in moments of a probability distribution of the received radar data wherein the moments are one of a skewness, a variance or a mean of the probability distribution;
wherein a condition for determining if the target is in the range bin is based upon comparing skewness changes relative to a defined threshold based upon characteristics of the breathing signal;
wherein a condition for determining if the target is in the range bin based on the skewness is defined by:

$$\text{Skewness} \underset{H_0}{\overset{H_1}{\gtreqless}} \beta = [\text{mean}(|\gamma|) - \sigma]$$

where, $H_0$ is a null hypothesis that an amplitude of the breathing signal is a result of interference only, and $H_1$ is a hypothesis that amplitude of the breathing signal is combined result of interference, clutter, and echoes from a target, $\beta$ is the threshold, $\gamma$ is the skewness in all range-bins, and $\sigma$ is the variance of the skewness in all range-bins; and identifying the verified one or more targets through an input/output interface of the device coupled to the processor.

* * * * *